US011693621B2

(12) United States Patent
Tada et al.

(10) Patent No.: US 11,693,621 B2
(45) Date of Patent: Jul. 4, 2023

(54) SOUND REPRODUCTION SYSTEM AND SOUND QUALITY CONTROL METHOD

(71) Applicant: Yamaha Corporation, Shizuoka (JP)

(72) Inventors: Yukio Tada, Iwata (JP); Kazuya Kumehara, Shizuoka (JP); Mitsuki Arita, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 260 days.

(21) Appl. No.: 17/210,368

(22) Filed: Mar. 23, 2021

(65) Prior Publication Data

US 2021/0301581 A1    Sep. 30, 2021

(30) Foreign Application Priority Data

Mar. 25, 2020 (JP) ................. 2020-054233

(51) Int. Cl.
*H04R 5/02* (2006.01)
*G06F 3/16* (2006.01)
*G01C 21/36* (2006.01)
*G10L 15/22* (2006.01)
*H04S 7/00* (2006.01)

(52) U.S. Cl.
CPC ......... *G06F 3/167* (2013.01); *G01C 21/3629* (2013.01); *G10L 15/22* (2013.01); *H04S 7/306* (2013.01); *G10L 2015/223* (2013.01)

(58) Field of Classification Search
CPC ..... G06F 3/167; G01C 21/3629; G10L 15/22; G10L 2015/223; H04S 7/306; E05F 2015/763
USPC .................................................. 381/309, 310
See application file for complete search history.

(56) References Cited

U.S. PATENT DOCUMENTS

| 2018/0216953 | A1  | 8/2018 | Suenaga |
| 2019/0197786 | A1* | 6/2019 | Molyneaux ............ G06V 20/64 |
| 2022/0078574 | A1* | 3/2022 | Tajik ....................... G06F 3/011 |

FOREIGN PATENT DOCUMENTS

WO    2017018298 A1    2/2017

* cited by examiner

*Primary Examiner* — Ammar T Hamid
(74) *Attorney, Agent, or Firm* — Global IP Counselors, LLP (57) ABSTRACT

A device system includes an acoustic device, a sensor, and a sound processor. The acoustic device is configured to be worn by a user. A sensor is configured to detect a movement of a shielding object. The sound processor is configured to generate sound with a first sound quality for a block state in which the shielding object blocks a virtual sound source localized on an opposite side of the shielding object and emit the sound from the acoustic device. The sound processor is further configured to change a sound quality of the sound from the first sound quality to a second sound quality for a non-block state in which the shielding object does not block the virtual sound source, in response to the sensor detecting that the shielding object moves from a position blocking the virtual sound source.

8 Claims, 10 Drawing Sheets

SOUND REPRODUCTION SYSTEM AND SOUND QUALITY CONTROL METHOD

CROSS-REFERENCE TO RELATED APPLICATIONS

This application claims priority to Japanese Patent Application No. 2020-054233, filed on Mar. 25, 2020. The entire disclosure of Japanese Patent Application No. 2020-054233 is hereby incorporated herein by reference.

BACKGROUND

Technical Field

This disclosure relates to an acoustic device and a sound quality control method for changing the sound quality of a virtual sound source in accordance with movements of a shielding object and the virtual sound source that is hidden by the shielding object.

Background Information

An AR system in which a user wears an audio device such as headphones or earphones in order to experience augmented reality (AR) has been proposed. The AR system emits sound from the audio device which corresponds to the location of the user. The AR system detects the current position of the user and the orientation of the user's head in order to localize the virtual sound source to a prescribed localization position. The AR system uses a head-related transfer function corresponding to the detected position and the orientation of the head and applies specific signal processing to the sound in order to localize the virtual sound source to the prescribed position.

The head-related transfer function is an acoustic transfer function from the sound source position to the ear canals of both ears of the user. By the time sound generated at the sound source position reaches the use's ears, the frequency characteristics will change with characteristics corresponding to the sound source direction, as a function of the shape of the head, the shape of the car auricle, and the like. The head-related transfer function represents the frequency characteristics that have changed by the time the sound reaches the use's ears, and is prepared for each sound source direction. The user discriminates between frequency characteristics unique to each sound source direction to determine the direction from which the sound has originated. Therefore, by means of the processing and reproduction of sound using the head-related transfer function of a prescribed direction, the AR system can give the user the impression that the sound is heard from the prescribed direction.

When there is a real or a virtual shielding object between the use's position and the virtual sound source, it is preferable for the sound quality to reflect the influence of the shielding object. For example, International Publication No. 2017/018298 discloses a voice navigation system that navigates a user by presenting directions corresponding to the location of the user. The document proposes changing (attenuating) the sound quality if there is a shielding object between a target object and the user's position when a guide voice is played in relation to the target object (destination). The system of International Publication No. 2017/018298 attenuates the navigation voice when there is a shielding object between the target object and the user's position, and does not localize the navigation voice at the position of the target object.

SUMMARY

Conventional AR systems do not control the sound quality of a virtual sound source in consideration of whether a localization position of the virtual sound source is a location that is being blocked by a shielding object, such as a real or virtual door or window. For this reason, there is the problem that the augmented reality becomes less realistic.

Thus, an object of one embodiment of this disclosure is to process more realistically the way in which a virtual sound source is heard, in consideration of the state of the virtual sound source being blocked by a shielding object such as a real-world door or window.

A device system according to one embodiment of this disclosure includes an acoustic device, a sensor, and a sound processor. The acoustic device is configured to be worn by a user. A sensor is configured to detect a movement of a shielding object. The sound processor is configured to generate sound with a first sound quality for a block state in which the shielding object blocks a virtual sound source localized on an opposite side of the shielding object and emit the sound from the acoustic device. The sound processor is further configured to change a sound quality of the sound from the first sound quality to a second sound quality for a non-block state in which the shielding object does not block the virtual sound source, in response to the sensor detecting that the shielding object moves from a position blocking the virtual sound source A sound quality control method according to one embodiment of this disclosure comprises generating sound with a first sound quality for a block state in which a shielding object blocks a virtual sound source localized on an opposite side of the shielding object and emitting the sound from an acoustic device, by a device system including the acoustic device configured to be worn by the user and the sensor configured to detect a movement of the shielding object, and changing, by the device system, a sound quality of the sound from the first sound quality to a sound quality for a non-block state in which the shielding object does not block the virtual sound source, in response to the sensor detecting that the shielding object moves from a position blocking the virtual sound source.

According to one embodiment of this disclosure, it become possible to process more realistically the way in which a virtual sound source is heard, in consideration of the state of the virtual sound source being blocked by a shielding object.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained with reference to the drawings. It will be apparent to those skilled in the field from this disclosure that the following descriptions of the embodiments are provided for illustration only and not for the purpose of limiting the invention as defined by the appended claims and their equivalents.

Figure 1:
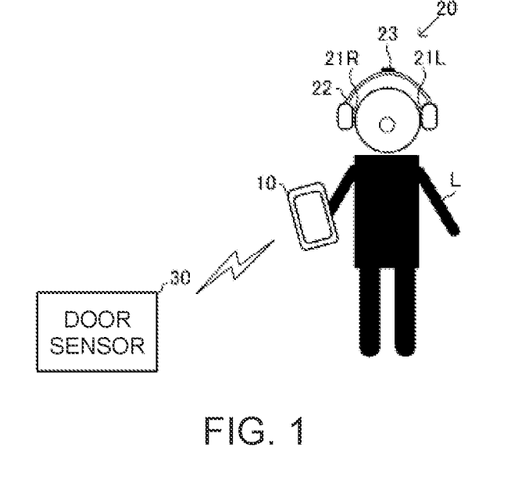
FIG. 1 is a diagram illustrating a configuration of a sound reproduction system, which is an embodiment of this disclosure.
Figure 2:
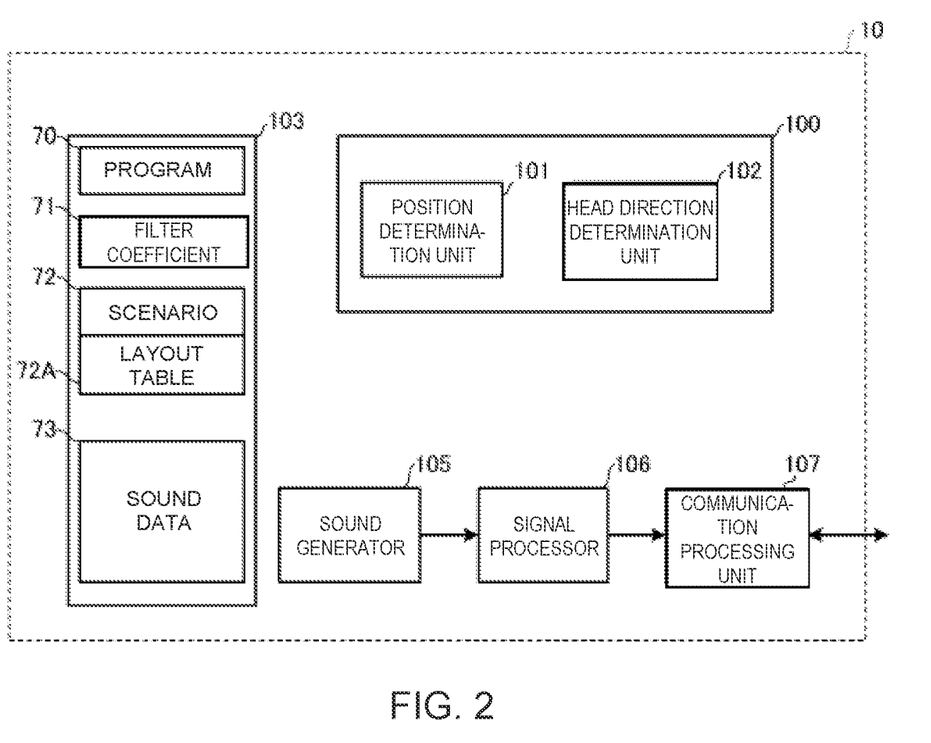
FIG. 2 is a block diagram of a mobile terminal device of the sound reproduction system.

FIG. 1 is a diagram illustrating a configuration of a sound reproduction system 1 to which this disclosure is applied. FIG. 2 is a block diagram of a mobile terminal device 10 of the sound reproduction system 1. The sound reproduction system 1 includes the mobile terminal device 10, headphones 20 as an acoustic device, and a door sensor 30. FIG. 1 shows an example in which a user L holds the mobile terminal device 10 in one hand and wears the headphones 20. The user L enters a room 201 shown in FIG. 5 equipped in this manner. When the user L enters the room 201, the mobile terminal device 10 reproduces a sound localized in a room 202, based on a scenario file 72 (also simply referred to as scenario 72). The headphones 20 correspond to the acoustic device of this disclosure.

For example, a smartphone (multifunctional mobile phone) is used as the mobile terminal device 10. The mobile terminal device 10 and the headphones 20 are connected by Bluetooth (registered trademark), and can communicate with each other. The connection between the mobile terminal device 10 and the headphones 20 is not limited to Bluetooth, and can be based on another wireless communication standard, or can be wired communication. The headphones 20 are so-called ear hook headphones that combines two speakers 21R, 21L, and a headband 22. The headphones 20 have a posture sensor 23 in the headband 22 and can track the orientation of the head of the user L. Any of a three-axis gyro (angular velocity) sensor, a six-axis sensor (three-axis gyro sensor+three-axis motion (acceleration) sensor), or a nine-axis sensor (three-axis gyro sensor+three-axis motion sensor+three-axis compass (direction) sensor) can be used as the posture sensor 23. Earphones can be used instead of the headphones 20 as the acoustic device.

The door sensor 30 (sensor) detects a movement of a shielding object. In this disclosure, the door sensor 30 detects the opened/closed state of a door 502 provided on a fixed wall 501 (refer to FIG. 5). The door sensor 30 sends information regarding the opened/closed state of the door 502 to the mobile terminal device 10. The door sensor 30 and the mobile terminal device 10 are connected by Bluetooth Low Energy (BLE). BLE and normal Bluetooth can be used together in one device. In this embodiment, Bluetooth is used to connect the mobile terminal device 10 and the headphones 20, as described above. The form of connection between the door sensor 30 and the mobile terminal device 10 is not limited to BLE. For example, the door sensor 30 and the mobile terminal device 10 can be connected to each other via Wi-Fi (registered trademark), a mobile communication network, the Internet, or the like.

FIG. 2 is a block diagram of the mobile terminal device 10. In terms of hardware, the mobile terminal device 10 is a smartphone comprising an electronic controller 100, a storage device 103, a sound generator 105, a signal processor 106, and a communication processing unit 107. The term "electronic controller" as used herein refers to hardware that executes software programs. The electronic controller 100 comprises a CPU (Central Processing Unit) having at least one processor. The electronic controller 100 can be configured to comprise, instead of the CPU or in addition to the CPU, programmable logic devices such as a DSP (Digital Signal Processor), an FPGA (Field Programmable Gate Array), and the like. In addition, the electronic controller 100 can include a plurality of CPUs (or a plurality of programmable logic devices). The storage device 103 is any computer storage device or any computer readable medium with the sole exception of a transitory, propagating signal. The storage device 103 can include nonvolatile memory and volatile memory. The storage device 103 has a ROM (Read Only Memory), a RAM (Random Access Memory), and a flash memory. Thus, any known storage medium, such as a magnetic storage medium or a semiconductor storage medium, or a combination of a plurality of types of storage media can be freely employed as the storage device 103.

The mobile terminal device 10, the headphones 20, and the door sensor 30 function as the sound reproduction system 1 by means of the mobile terminal device 10 starting a program 70 stored in the storage device 103.

The storage device 103 stores the above-described program 70, the scenario file 72, and sound data 73. The program 70 is an application program that causes the mobile terminal device 10, the headphones 20, and the door sensor 30 to function as a sound reproduction system 1. The scenario file 72 is a file in which a procedure for sequentially reproducing a prescribed sound to the user L is described. The scenario file 72 includes a layout table 72A in which the shape of a location where the sound is reproduced, such as a building 200 shown in FIG. 5, and the arrangement of a wall 500, are included. The sound data 73 are data of the sound that is reproduced in accordance with the scenario file 72. The sound data 73 can be sound signals such as PCR (Pulse Code Modulation) or MP4, or sound synthesis data utilizing the sound generator 105 as a synthesizer. If the sound data 73 are sound signals, the electronic controller 100 can read the sound generator 105.

A filter coefficient 71 includes a head-related transfer function and an impulse response at a prescribed position in the room 201. These filter coefficients are used for localizing a virtual sound source SP1 shown in FIG. 5, etc., at a prescribed position with respect to the user L. The filter coefficients 71 are used by the signal processor 106. In the following description, SP1 is also referred to as a virtual sound source position.

The electronic controller 100 controls the operation of the mobile terminal device 10. The electronic controller 100 includes a position determination unit 101 and a head orientation determination unit 102, and executes functions as the position determination unit 101 and the head orientation determination unit 102 by means of the starting of the program 70. The position determination unit 101 determines the current position of the mobile terminal device 10. In the sound reproduction system 1, the position of the mobile terminal device 10 is used as the position of the user L. For outdoor use, a satellite positioning system such as GPS (Global Positioning System) or Michibiki can be used as the position determination unit 101. For indoor use, a position measurement system such as a beacon installed indoors can be used as the position determination unit 101. Even indoors, the position determination unit 101 can first determine (calibrate) the accurate position using a satellite positioning system outdoors, and then trace the movement of the user L using the posture sensor 23 thereafter to determine the position indoors. When the movements of the user L are traced, the posture sensor 23 is preferably a six-axis sensor or a nine-axis sensor that can detect the motion of the user L.

The head orientation determination unit 102 determines the orientation of the head of the user L based on the detection value of the posture sensor 23 acquired from the headphones 20. If the posture sensor 23 is a three-axis gyro sensor, the electronic controller 100 first causes the user L to face a prescribed direction and determines (calibrates) the head direction. The electronic controller 100 thereafter acquires angular velocity information from the posture sensor 23 and integrates this angular velocity information in the head direction in order to determine the current orientation of the head of the user L. If the posture sensor 23 includes a gyro sensor and a compass sensor, changes in the head direction of the user L can be followed by the gyro sensor which has a fast response, and the integration error of the gyro sensor can be canceled by the compass sensor, which has a slow response.

The sound generator 105 reproduces the sound data 73. The sound data 73 can be sound signals such as PCM or MP4, or sound synthesis data utilizing the sound generator 105 as a synthesizer. The sound generator 105 is realized or formed by a processor such as a DSP (digital signal processor). The signal processor 106 is realized or formed by a processor such as a DSP (digital signal processor), and controls the sound quality of the sound in accordance with the positions of the virtual sound source SP1 (refer to FIG. 5) and the user L. In addition, the signal processor 106 determines the localization of the sound in accordance with the position and orientation of the user L acquired from the position determination unit 101 and the head orientation determination unit 102, reads the head-related transfer function in the localization direction, and filters the sound. The sound generator 105 and the signal processor 106 correspond to the sound processor of this disclosure. The sound generator 105 and the signal processor 106 can be realized or formed by a single DSP or a plurality of DSPs.

With respect to the user L in the room 201, the sound reproduction system 1 localizes the sound in the adjacent room 202 separated by the wall 500, based on the scenario file 72 (refer to FIGS. 5-8). The door 502 is provided on the wall 500. When the door 502 is closed, the sound reproduction system 1 reproduces a sound with a sound quality as if the sound were heard from a room on the other side of the wall 500. When the door 502 is open, the sound reproduction system 1 reproduces a sound with a sound quality as if sound resonating in the room 202 were heard through the door frame 503. The mobile terminal device 10 (communication processing unit 107) transmits the processed sound to the headphones 20. The headphones 20 output the received sound from the speakers 21R, 21L. As a result, the auditory sense of the user L is that of the sound being heard from a preset localization position in accordance with the scenario file 72.

Figure 3:
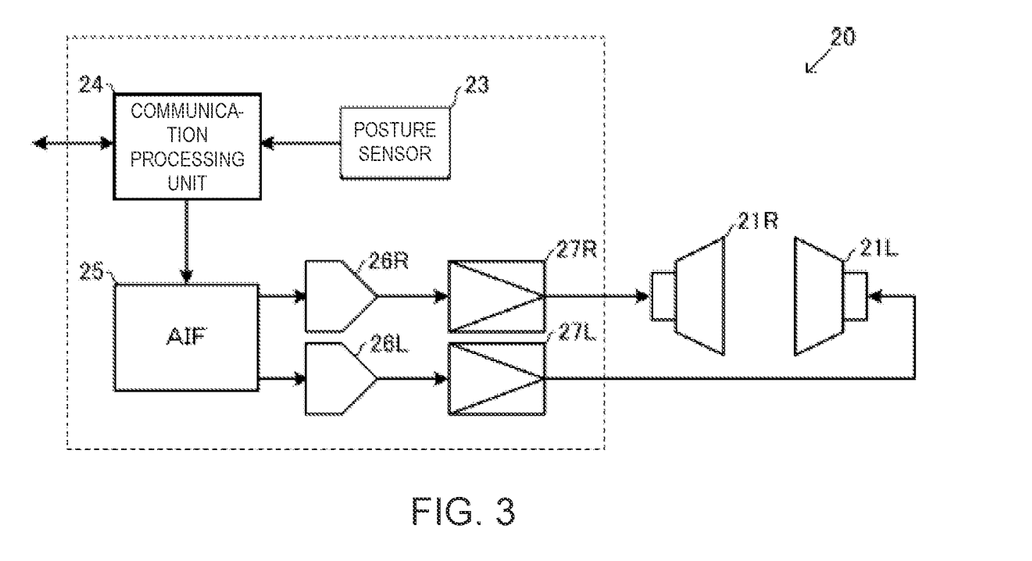
FIG. 3 is a block diagram of headphones of the sound reproduction system.
Figure 4:
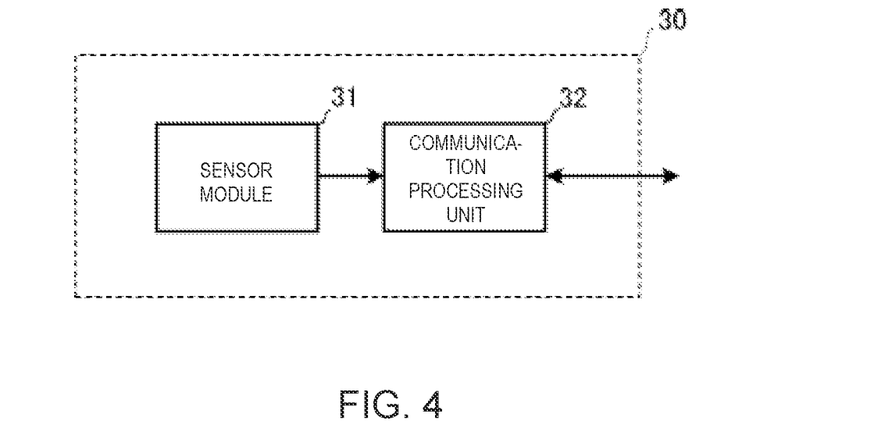
FIG. 4 is a block diagram of a door sensor of the sound reproduction system.

The communication processing unit 107 is a wireless communication device and communicates with the door sensor 30, and the headphones 20, which are Bluetooth-compatible devices. The communication processing unit 107 communicates with a communication processing unit 24 of the Bluetooth headphones 20. The communication processing unit 107 communicates with a communication processing unit 32 of the door sensor 30 by means of Bluetooth BLE. The communication processing unit 107 transmits audio signals to the headphones 20 and receives the detection value of the posture sensor 23 from the headphones 20. The communication processing unit 107 receives information regarding the opened/closed state of the door 502 from the door sensor 30.

FIG. 3 is a block diagram illustrating the configuration of the headphones 20. The headphones 20 comprise the speakers 21R. 21L, the posture sensor 23, the communication processing unit 24, an AIF (Audio Interface) 25, a DACs (Digital/Analog Converter) 26L, 26R, and amplifiers 27L, 27R.

The communication processing unit 24 communicates with the mobile terminal device 10 (communication processing unit 107) by means of Bluetooth or BLE (Bluetooth Low Energy). The AIF 25 separates the sound signal received from the mobile terminal device 10 into left and right channel signals and transmits the signals to the DACs 26L, 26R. The DACs 26L, 26R convert digital signals input from the AIF 25 into analog signals. The amplifiers 27L, 27R amplify the analog signals input from the DACs 26L, 26R and supply the signals to the speakers 21R, 21L. As a result, the sound signals received from the mobile terminal device 10 are emitted from the speakers 21R, 21L as sound. The headphones 20 are worn on the head of the user L so that the sound emitted from the speakers 21R, 21L is heard by the left and right ears of the user L.

Figure 5:
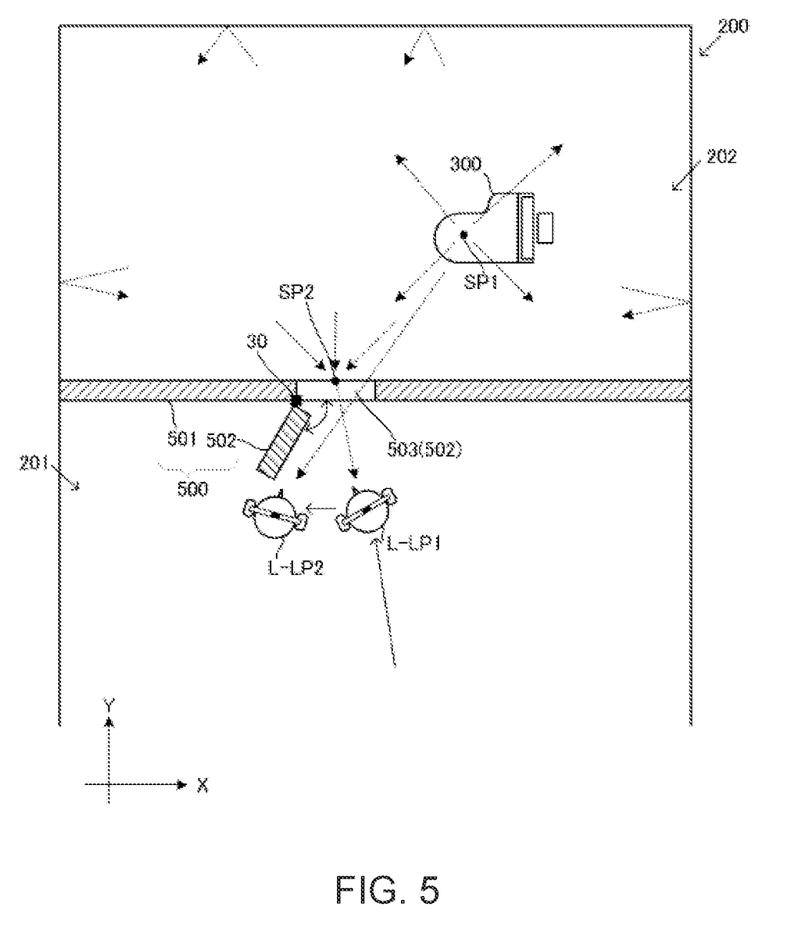
FIG. 5 is a plan view of a building in which the sound reproduction system is used.

FIG. 4 is a block diagram of the door sensor 30. As shown in FIG. 5, the door sensor 30 is attached near a hinge of the door 502 and detects as well as outputs information regarding the opened/closed state of the door 502 with respect to the fixed wall 501. The information regarding the opened/closed state is represented by an angle relative to the fixed wall 501. The door sensor 30 is equipped with a sensor module 31 and the communication processing unit 32. The door sensor 30 detects a degree of the opening and closing of the door 502. More specifically, the sensor module 31 detects the opened/closed state of the door 502. The sensor module 31 includes, for example, a rotary encoder, a semiconductor sensor, a photoelectric sensor, or the like. The rotary encoder rotates coaxially with the hinge of the door 502 and detects the rotational angle or the absolute angle of the door 502. The semiconductor sensor detects the angular velocity due to the opening and closing of the door 502 and integrates this angular velocity to calculate the angle of the door 502. The optical sensor has a light-emitting unit and a light-receiving unit on the door 502 and the fixed wall 501, respectively, and detects the angle of the door 502 based on the change in position of the light that passes from the light-emitting unit to the light-receiving unit. The sensor module 31 is not limited by the aforementioned description. For example, the sensor module 31 can be a potentiometer. In addition, if it is only necessary for the sensor module 31 to detect whether the door 502 is completely closed or even slightly open, the sensor module 31 can be a limit switch. The communication processing unit 32 transmits the information regarding the opened/closed state of the door 502 detected by the sensor module 31 to the mobile terminal device 10.

FIG. 5 is a plan view of the building 200 into which the user L is lead and in which the scenario is carried out by the sound reproduction system 1 of this disclosure. The building 200 is provided with the room 201 (first space) and the room 202 (second space). The room 201 and the room 202 is separated by the wall 500. The wall 500 has the fixed wall 501 and the door 502 provided on a portion of the fixed wall 501. The door 502 is attached to the door frame 503 formed on the fixed wall 501. The door 502 opens toward the inside of the room 201. The wall 500 corresponds to the shielding object of this disclosure.

The location of the building 200 and its interior are specified in XY coordinates. As shown in the lower left of FIG. 5, the XY coordinates are determined based on an X-axis that extends along the left-right direction of the figure and a Y-axis that extends along the up-down direction of the figure. The shapes of the rooms 201, 202, the position of the wall 500, and the position of the door 502 are all represented by the XY coordinates, and are stored in the layout table 72A. The sound reproduction system 1 according to the present embodiment carries out the sound localization process two-dimensionally, that is, the position of the sound source, the positions of the ears of the user L, etc., are all assumed to be at the same height in the sound image localization process. When the sound image localization process is performed three-dimensionally to include height, a Z-axis in the height direction can be set in the front-back direction of the drawing.

The door 502 is provided with the door sensor 30 for detecting the opened/closed state of the door 502. In FIG. 5, the door 502 is opened toward the interior of the room 201. The door 502 can be opened manually by the user L or automatically by means of an actuator, which is not shown.

The user L moves round the room 201 and listens to the sound reproduced by the sound reproduction system 1. The sound reproduction system 1 refers to the scenario file 72 based on the position of the user L, the time, and the like, and reproduces the sound according to instructions from the scenario file 72. In the scenario shown in FIG. 5, the sound reproduction system 1 reproduces sound of a piano performance localized at the virtual sound source SP1 of the room 202. In FIG. 5, an actual piano 300 is installed at the location of the virtual sound source SP1, but the actual piano 300 is not essential.

In FIG. 5, when the sound of the piano performance is heard over the headphones 20, the user L moves to a position LP1 close to the door 502 and opens the door 502 (FIG. 5 shows a state in which the door 502 is open). As a result, the user L recognizes that the piano 300 is being played in the room 202, but the user L cannot directly see the piano 300 (virtual sound source SP1) from the position LP1 because his/her view is blocked by the fixed wall 501. After opening the door 502, the user L moves to a position LP2 in order to find the place where the sound originates. The user L, having moved to the position LP2, looks into the room 202 from the door frame 503 and finds the piano 300 (virtual sound source SP1).

The mode of controlling the sound quality of the sound (the sound of the piano performance) by the sound reproduction system 1 when the user L acts in the manner described above is as follows. When the door 502 is closed, the sound reproduction system 1 reproduces the sound of the piano performance with a sound quality (a first sound quality for a block state) as if the piano 300 were being played on the other side of the wall 500 and the sound were coming through the wall 500 (door 502) with respect to the user L. When the door 502 is open, the sound reproduction system 1 reproduces the sound of the piano performance with a sound quality (a second sound quality for a non-block state) as if the sound of the piano performance resonating in the room 202 were heard through the door frame 503. In other words, when the door 502 is opened, the sound reproduction system 1 changes a sound quality of the sound of the piano performance from the first sound quality to the second sound quality. However, at the position LP1, the user L cannot directly hear the sound of the piano performance, which is localized at the virtual sound source SP1. The user L then moves to the position LP2, which is a location from which the piano 300 can be seen. When the user L moves to the position LP2, the sound reproduction system 1 reproduces the direct sound of the piano performance to the user L. In other words, when the user L moves to the position LP2, the sound reproduction system 1 generates a sound with a third sound quality for a state in which the localization position of the piano comes into direct view, instead of the second sound quality.

Figure 6:
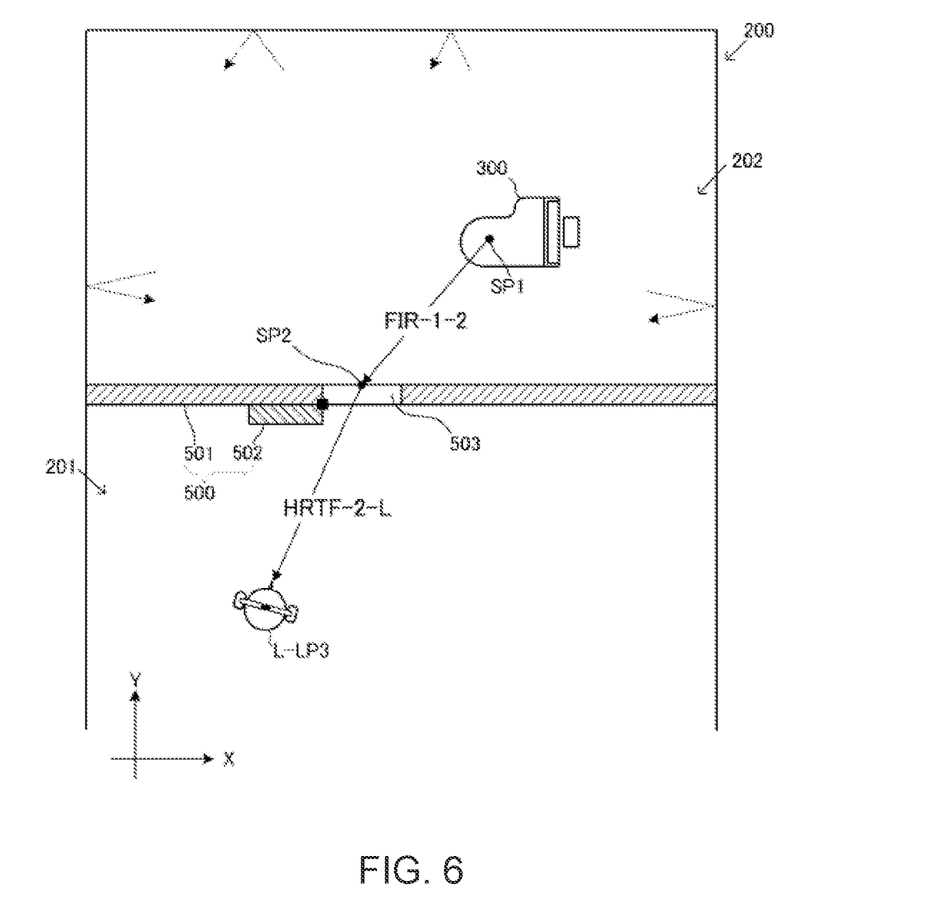
FIG. 6 is a diagram explaining an indirect sound in the sound reproduction system.
Figure 7:
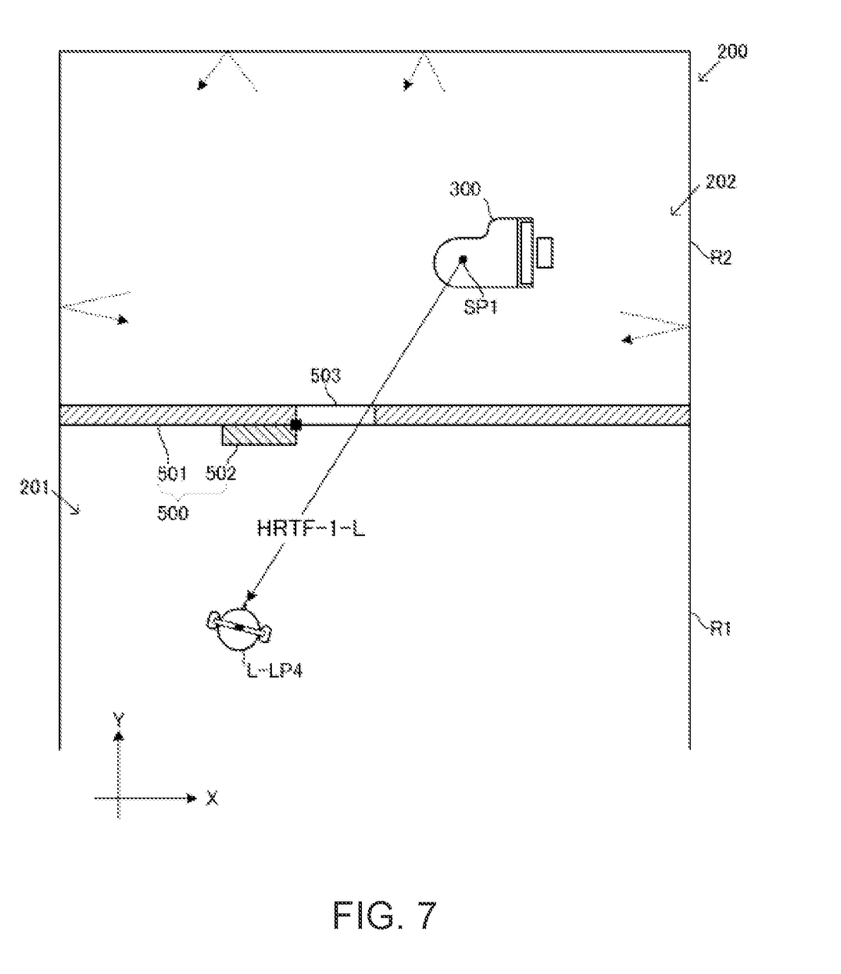
FIG. 7 is a diagram explaining a direct sound in the sound reproduction system.
Figure 8:
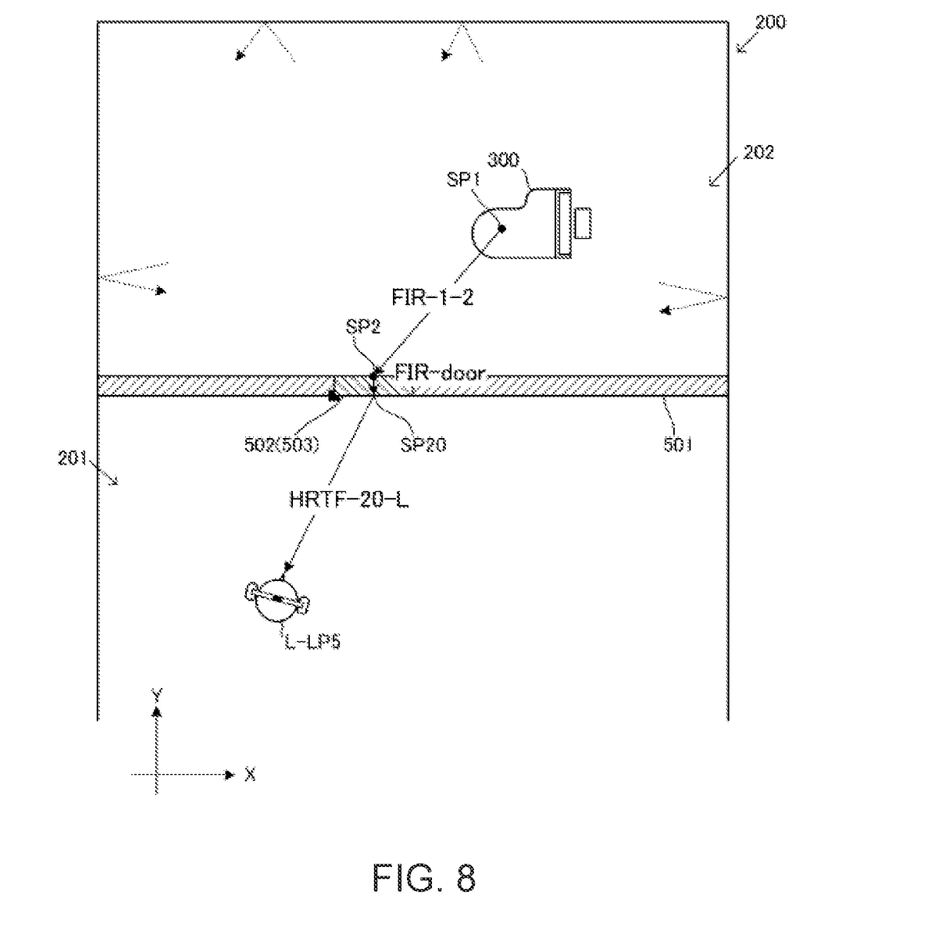
FIG. 8 is a diagram explaining a transmitted sound in the sound reproduction system.

The modes of transmission of sound generated at the virtual sound source SP1 when the door 502 is closed, when the door 502 is open and the user L is at the position LP1, and when the user L has moved to the position LP2 will be described with reference to FIGS. 6-8. In the following description, sound generated at the virtual sound source SP1 is referred to as sound S (SP1). In the description of FIGS. 5-9 and FIG. 13, the parentheses "( )" such as those around the sound S (SP1) have been replaced with "-".

FIG. 6 is a diagram explaining the sound (indirect sound) that is heard by the user L through the door frame 503 in a state in which the door 502 is open. The sound S (SP1) propagates into the entire room 202 and is reflected from the walls, etc., to reverberate in the room 202. The sound of the reverberation at the position SP2 (position of an open door) is sounded even at the position SP2 of the door frame 503. The sound heard at the position SP2 is referred to as sound S (SP2). The propagation of sound from the virtual sound source SP1 to the position SP2 is represented by an impulse response, which is measured by a microphone installed in the position SP2 to detect sound from a virtual sound source SP1. Hereinbelow, this impulse response is referred to as impulse response IR (1-2). As described above, the impulse response IR (1-2) represents the response waveform when the sound of the piano performance S (SP1) reverberating in the room 202 is heard at the position SP2. The sound S (SP2) is obtained by filtering the sound S (SP1) with an FIR (Finite Impulse Response) filter that convolves the impulse response IR (1-2).

If the door 502 is open, the sound S (SP2) that reaches the door frame 503 propagates into the room 201 and reaches the user L. The propagation of sound from the position SP2 of the door frame 503 to both ears of the user L is represented by the head-related transfer function corresponding to the orientation of the head of the user L and the position of the user L. Hereinbelow, the head-related transfer function at this time is referred to as head-related transfer function HRTF (2-L). Indirect sound S (L open), which is the sound heard by the user L from the open door 502 (door frame 503) can be obtained by processing the sound S (SP2) with the head-related transfer function HRTF (2-L). Specifically, the indirect sound S (L open) is obtained by filtering with an FIR filter that convolves a head-related impulse response, which is obtained by converting the head-related transfer function HRTF (2-L) into a sequence of time-domain coefficients, into the sound S (SP2). In order to facilitate processing, reverberation (impulse response) in the room 201 is not taken into consideration.

FIG. 7 is a diagram explaining the sound (direct sound) that is heard by the user L directly from the sound source. When the user L is at the position LP2, since the virtual sound source SP1 is in direct view, the direct sound of the sound S (SP1) can be heard. The propagation of the direct sound is represented by the head-related transfer function that corresponds to the orientation of the head of the user L and the position of the user L relative to the virtual sound source SP1. Hereinbelow, the head-related transfer function at this time is referred to as the head-related transfer function HRTF (1-L). Direct sound S (L direct) can be obtained by processing the sound S (SP1) with the head-related transfer function HRTF (1-L). Specifically, the direct sound S (L direct) is obtained by filtering with an FIR filter that convolves a head-related impulse response, which is obtained by converting the head-related transfer function HRTF (I-L) into a sequence of time-domain coefficients, into the sound S (SP1).

FIG. 8 is a diagram explaining the sound (transmitted sound) heard by the user L through the closed door 502. In this embodiment, no sound is transmitted through the fixed wall at all. When the door 502 is closed, the user L in the room 201 hears the sound transmitted from the room 202 through the door 502. The sound that reaches the door 502 is the sound S (SP2) described above. Transmitted sound S (L door) is the sound S (SP2) that reaches the door 502, passes through the closed door 502 and onto the door surface (on the room 201 side) SP20, and is transmitted from the door surface SP20 to the user L. Therefore, the propagation of the sound S (L door) is represented by the following three impulse responses. The impulse response from the virtual sound source SP1 to the door 502 (SP2), the impulse response from the door 502 (SP2) to the door surface SP20, and the head-related transfer function HRTF (20-L) from the door surface SP20 to the user L. In order to facilitate processing, reverberation (impulse response) in the room 201 is not taken into consideration.

The head-related transfer function HRTF (20-L) is treated as if it were almost the same as the head-related transfer function HRTF (2-L) of FIG. 6. Therefore, the head-related transfer function HRTF (2-L) can be used as the head-related transfer function HRTF (20-L).

The impulse response from the door 502 (SP2) to the door surface SP20 is the sound insulation characteristic of the door 502. Hereinbelow, the impulse response of the sound insulation characteristic of the door 502 is referred to as impulse response IR (door).

Indirect sound S (L door), which is the sound that is heard by the user L through the closed door 502, can be obtained by processing the sound S (SP20) with the head-related transfer function HRTF (20-L). Specifically, the transmitted sound S (L door) is obtained by filtering with an FIR filter that convolves the head-related impulse response, which is obtained by converting the head-related transfer function HRTF (20-L) into a sequence of time-domain coefficients, into the sound S (SP20).

As shown in FIG. 8, when the door 502 is closed, the sound reproduction system 1 reproduces only the transmitted sound S (L door) to the user L.

As shown in FIG. 6, when the door 502 is open but the user L is in a location where the piano 300 cannot be seen (for example, location LP1), the sound reproduction system 1 reproduces the indirect sound S (L open) heard from the door frame 503 by the user L.

As shown in FIG. 7, if the door 502 is open and the user L is in a location where the piano 300 can be seen (for example, position LP2), the sound reproduction system 1 reproduces the direct sound S (L direct) from the virtual sound source SP1 (piano 300) and the indirect sound S (L open) for the user L. This is because, even if the user L is in a location where the piano 300 can be seen, the indirect sound S (L open) can be heard by the user L.

The gain of the direct sound S (L direct) can be changed depending on whether the user L is in a position where the piano 300 (virtual sound source SP1) is fully in view or only partially in view. In addition, in this case, the sound quality can be adjusted, such as by slightly attenuating the high frequencies of the frequency range.

Figure 9:
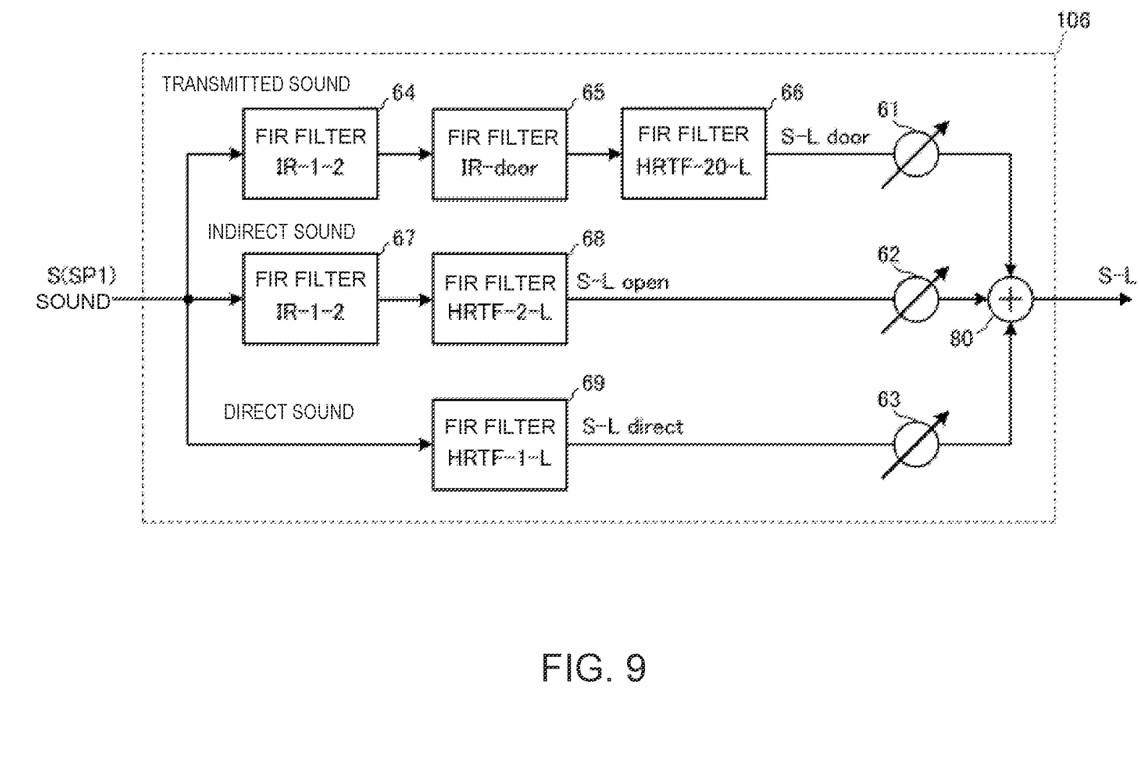
FIG. 9 is a diagram illustrating a configuration of a signal processing unit of a mobile terminal device.

FIG. 9 is a functional block diagram of the signal processor 106. The signal processor 106 is formed by, for example, a DSP (digital signal processor), and various functional units for carrying out signal processing of the sound generated by the sound generator 105 are configured by means of a program. As described above, the sound generator 105 generates sound such as the sound of a piano performance. The signal processor 106 processes sound and generates the transmitted sound S (L door), the indirect sound S (L open), and the direct sound S (L direct). The illustrated filters 64-69 are all FIR filters. In FIG. 9, the signal flow is represented by a single line, the processed sound signals are signals of two, left and right, channels.

The filters 64-66, which are connected in series, generate the transmitted sound S (L door) for the case in which the door 502 is closed. The impulse response IR (1-2) from the virtual sound source SP1 to the position SP2 is set in the filter 64. The filter 64 filters the sound S (SP1) to generate the sound S (SP2). The impulse response JR (door), which is the sound insulation characteristic of the door 502, is set by the filter 65. The filter 65 filters the sound S (SP2) to generate the sound S (SP20). The head-related transfer function (head-related impulse response) HRTF (20-L), corresponding to the orientation of the head and the position of the user L from the position SP20 on the room 201 side of the door 502, is set by the filter 66. The filter 66 filters the sound S (SP20) to generate the transmitted sound S (L door). In this embodiment, three filters 64-66 are provided for computing the impulse response IR (1-2), the impulse response (sound insulation characteristic) 1R (door), and the head-related transfer function HRTF (20-L). However, the transmitted sound S (L door) can be generated by using one filter that combines these filter coefficients.

The filters 67, 68, which are connected in series, generate the indirect sound S (L open) for the case in which the door 502 is open. The impulse response IR (1-2) from the virtual sound source SP1 to the position SP2 is set in the filter 67. The filter 67 filters the sound S (SP1) and generates the sound S (SP2). The head-related transfer function (head-related impulse response) HRTF (2-L), which corresponds to the orientation of the head and the location of the user L relative to the position SP2 of the door 502, is set by the filter 68. The filter 68 filters the sound S (SP2) to generate the transmitted sound S (L open). In this embodiment, two filters 66, 67 are provided for the impulse response IR (1-2) and the head-related transfer function HRTF (20-L). However, the indirect sound S (L open) can be generated using one filter that combines these filter coefficients.

The filter 69 generates the direct sound S (L direct). The head-related transfer function (head-related impulse response) HRTF (1-L), which corresponds to the orientation of the head of the user L and the location of the user L relative to the virtual sound source SP1, is set by the filter

69. The filter 69 filters the sound S (SP1) to generate the transmitted sound S (L direct).

Gain adjustment units 61-63 adjust the gain and control the on/off of the generated transmitted sound S (L door), the indirect sound S (L open), and the direct sound S (L direct), respectively on/off. Since the impulse response and the head-related impulse response include volume control elements, the signal processor 106 usually does not need to adjust the gain after generation of the transmitted sound S (L door) described above. Gain adjustment units 61-63 are used when the gain of the indirect sound S (L open) is adjusted in accordance with the opening angle of the door 502, and when the transmitted sound S (L door) and the indirect sound S (L open), etc., are cross-faded. Accordingly, the sound processor can generate, for example, the sound S (L) with a sound quality obtained by cross-fading a sound quality of the transmitted sound S (L door) and a sound quality of the indirect sound S (L open), in accordance with the degree of the opening or closing of the door 502 detected by the door sensor 30.

An addition unit 80 adds the transmitted sound S (L door), the indirect sound S (L open), and the direct sound S (L direct), whose gains have been adjusted by the gain adjustment units 61-63, in order to generate the sound S (L) that is output to the headphones 20. The signal processor 106 inputs the sound S (L) to the communication processing unit 107. The communication processing unit 107 transmits the sound S(L) to the headphones 20. The signal processor 106 can also combine the filter coefficients and the gain values of all of the filters 64-69 and all of the gain adjustment units 61-63 to calculate one filter coefficient. The signal processor 106 can use this filter coefficient and generate the sound S(L) with one FIR filter using this filter coefficient.

Figure 10:
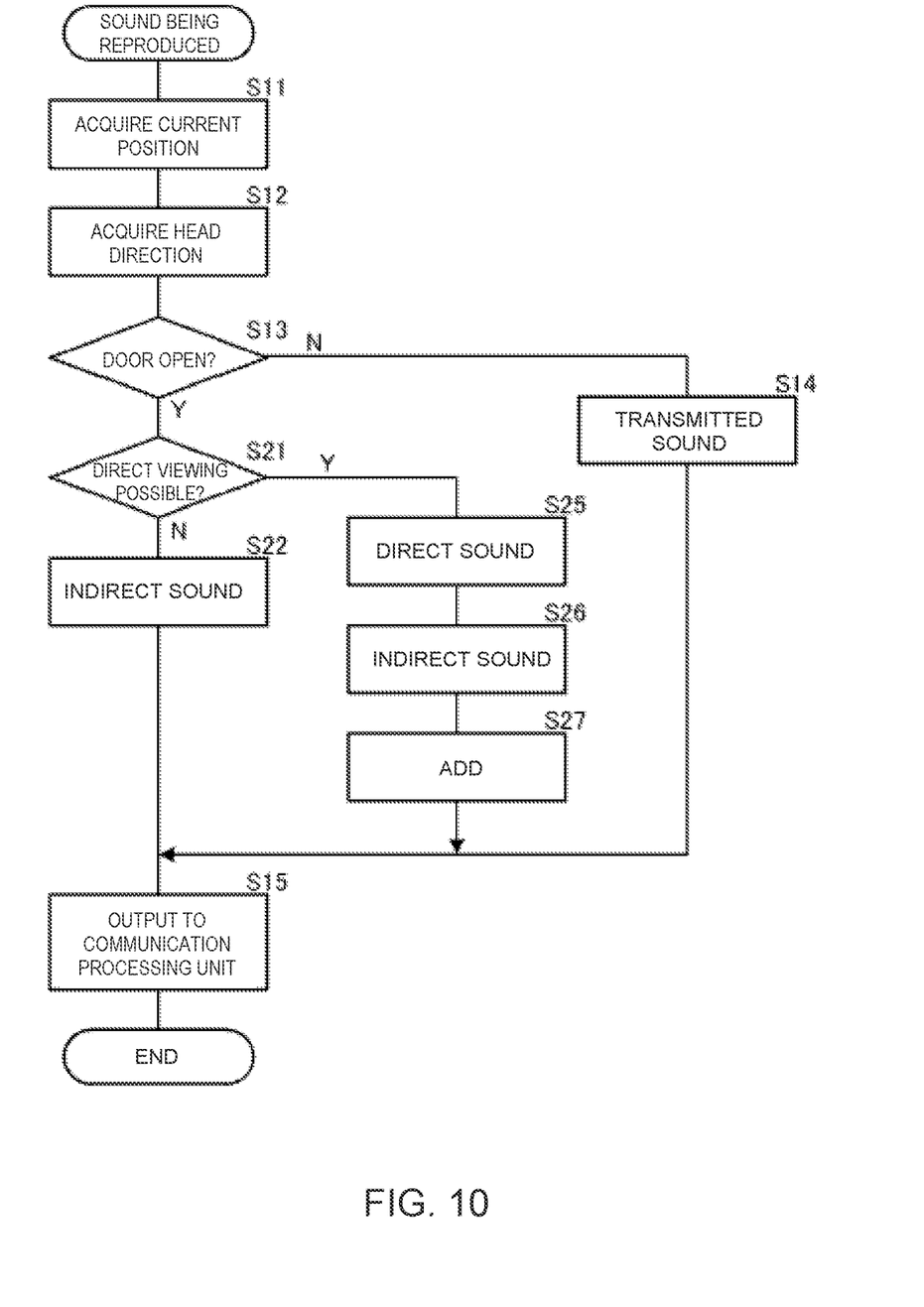
FIG. 10 is a flowchart illustrating a processing operation of the mobile terminal device.

FIG. 10 is a flowchart illustrating the sound signal processing operation of the mobile terminal device 10. This process is executed when the sound is being generated based on the scenario file 72. This process is executed periodically, for example, every 20 milliseconds, by the signal processor 106 and the electronic controller 100 of the mobile terminal device 10.

The electronic controller 100 acquires the current position and the orientation of the head of the user L (S11 and S12). Hereinbelow, in this flowchart, Step Sn (n is any numerical value) is simply referred to as Sn. The electronic controller 100 determines the signal received from the door sensor 30 and determines whether the door 502 is open (S13). If the door 502 is closed (NO in S13), since the user L can only hear the transmitted sound, the signal processor 106 shown in FIG. 9 is instructed to generate the transmitted sound S (L door) (S14). The transmitted sound S (L door) output from the signal processor 106 is output to the communication processing unit 107 (S15).

If the door 502 is open (YES in S13), the electronic controller 100 determines whether the user L is in a location where the virtual sound source SP1 (piano 300) is in direct view (S21). If the location permits direct viewing (YES in S21), the electronic controller 100 advances the process to Step S25. If the location does not permit direct viewing (NO in S21), the electronic controller 100 advances the process to Step S22.

If the user L is in a location from which the virtual sound source SP1 cannot be directly seen (NO in S21), the electronic controller 100 instructs the signal processor 106 to generate the indirect sound S (L open). At this time, the electronic controller 100 selects one head-related transfer function based on the orientation of the head and the position of the user L, and sets the head-related transfer function in the filter 68. The indirect sound S (L open) output from signal processor 106 is output to the communication processing unit 107 (S15).

If the door 502 is open and the user L is in a location from which the virtual sound source SP1 can be directly seen (YES in S21), the electronic controller 100 instructs the signal processor 106 to generate the direct sound S (L direct) and the indirect sound S (L open) (S25, S26). At this time, the electronic controller 100 sets one head-related transfer function for each of the filters 68, 69, based on the orientation of the head and the position of the user L. The signal processor 106 adds the generated direct sound S (L direct) and the indirect sound S (L open) to generate the sound S(L) (S27), and outputs the sound to the communication processing unit 107 (S27).

The electronic controller 100 determines whether the door 502 is open or closed in Step S13 of FIG. 10. If the door 502 is open, the electronic controller 100 can determine at what angle the door is opened, and adjusts the gain of the indirect sound S (L open) in accordance with the angle. Moreover, the electronic controller 100 can adjust the sound quality of the indirect sound S (L open) in accordance with the opening angle of the door 502.

Figure 11:
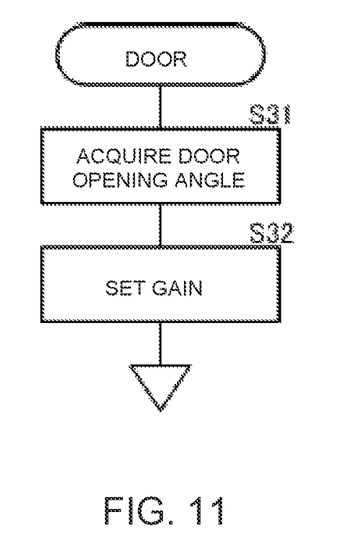
FIG. 11 is a flowchart illustrating the processing operation of the mobile terminal device.

FIG. 11 is a flowchart illustrating the process for adjusting the gain of the indirect sound S (L open) in accordance with the opening angle of the door 502. The electronic controller 100 acquires the opening angle of the door 502 from the door sensor 30 (S31). The electronic controller 100 sets the gain corresponding to the opening angle with a gain adjustment unit 62 based on the acquired opening angle. At this time, the electronic controller 100 can control the sound processor to carry out a process (cross-fade) that increases the gain of the indirect sound S (L open) and decreases the gain of the transmitted sound S (L door), as the opening angle of the door 502 increases (S32).

The electronic controller 100 determines whether the user L is in a location from which the virtual sound source SP1 can be directly seen, in Step S21 of FIG. 10. The electronic controller 100 can give a prescribed size to the virtual sound source SP1 such as that of the piano 300, and adjust the gain of the direct sound S (L direct) in accordance with how much of the virtual sound source SP1 the user L can directly see. Moreover, the electronic controller 100 can adjust the sound quality of the direct sound S (L direct) in accordance with how much of the virtual sound source SP1 the user L can directly see.

Figure 12:
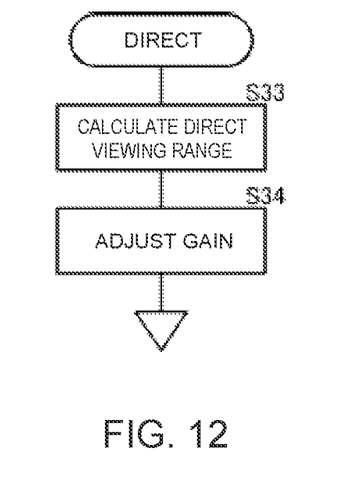
FIG. 12 is a flowchart illustrating the processing operation of the mobile terminal device.

FIG. 12 is a flowchart illustrating the process of adjusting the gain of the direct sound S (L direct) in accordance with how much of the virtual sound source SP1 the user L can directly see. The electronic controller 100 calculates how much of the virtual sound source SP1 can be directly seen by the user L (S33) from his/her location. The calculation of the direct viewing range is carried out based on the coordinates of the user L, the virtual sound source SP1, and the door frame 503. The electronic controller 100 sets a gain in the gain adjustment unit 62 in accordance with the calculated direct viewing range (S34). That is, the electronic controller 100 can set a gain of 100% if the entire virtual sound source SP1 is in direct view of the user L. and can decrease the gain as the range of the virtual sound source SP1 that is in direct view of the user L becomes narrower.

In the embodiment described above, the case in which the virtual sound source SP1 (piano 300) does not move was described. In the following embodiment, the case of a moving virtual sound source SP1 will be described. In this embodiment, parts having the same configuration as the embodiment above are assigned the same numbers, and their descriptions are omitted.

Figure 13:
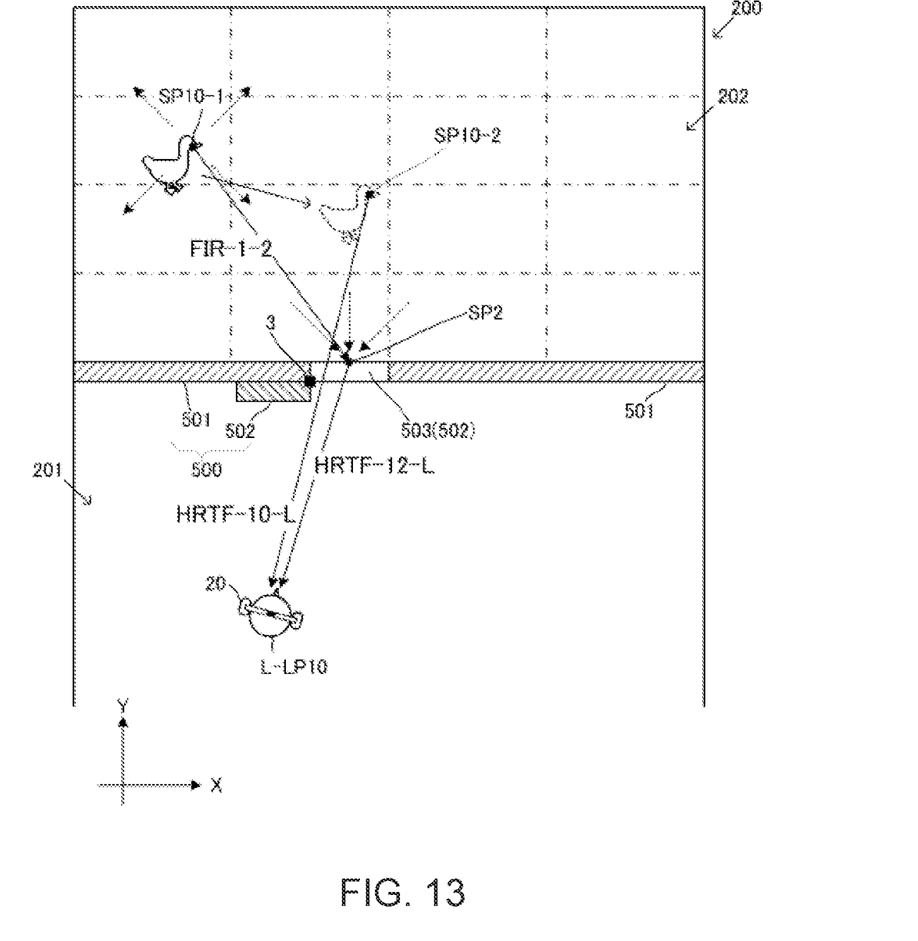
FIG. 13 is a plan view of a building in a case in which a sound source moves in the sound reproduction system.

FIG. 13 is a diagram illustrating the arrangement of a virtual sound source SP10 and the user L in the building 200. The layouts of the rooms are the same as those shown in FIG. 5. In FIG. 13, the virtual sound source SP10 has the appearance of a bird, moves from a position SP 10 (1) to a position SP 10 (2). The door 502 is open. In the embodiment of FIGS. 6, 7, the user L himself or herself can move so that it becomes possible to directly view the virtual sound source SP1. In this embodiment, by means of the movement of the virtual sound source SP10, it becomes possible for the virtual sound source SP10 to come into direct view of the user L.

The user L remains at the position LP10. When the virtual sound source SP10 is in position SP 10 (1), the user L cannot directly see the virtual sound source SP10 so that the user L hears indirect sound S (L open). The indirect sound S (L open) is the same as that described in FIG. 6, and is calculated from the impulse response of the virtual sound source SP10 (1) at SP2, and the head-related transfer function from SP2 to the user L. When the virtual sound source SP10 moves to the position SP 10 (2), the user L can directly see the virtual sound source SP10 through the door frame 503. The user L hears the direct sound S (L direct). The direct sound S (L direct) is the same as that described in FIG. 7, and is calculated using the head-related transfer function from SP 10 (2) to the user L. In addition, even when the direct sound can be heard, the indirect sound can also be heard in a parallel manner. This indirect sound is calculated from the impulse response of the virtual sound source SP10 (2) at SP2, and the head-related transfer function from SP2 to the user L.

When the virtual sound source SP10 moves, the electronic controller 100 can acquire the position of the virtual sound source SP10 in parallel with S11, 12 in the flowchart of FIG. 10, and calculate whether the user L can directly see the virtual sound source SP10.

FIG. 13 shows an example in which the user L is stationary. Moreover, it is also possible to realize an embodiment in which the user L moves in the same manner as in FIGS. 5-8 and the virtual sound source SP10 moves.

The door 502 of the embodiment is a hinged door. The door 502 includes not only hinged doors, but also doors that open and close by means of other mechanisms, such as sliding doors. It is also possible to realize an embodiment in which the door 502 is always open, as well as an embodiment in which there is no door 502, that is, an embodiment in which there is only the door frame 503 (opening).

FIG. 5 is an example of the case in which the user L opens the door 502. It is also possible to realize an embodiment in which the user L closes the open door 502.

The example of FIG. 8 is an embodiment in which, when the door 502 is closed, transmitted sound is heard only from the door 502. It is also possible to realize an embodiment in which transmitted sound is heard from the entire wall 500 when the door 502 is closed.

In the embodiments described above, the sound generator 105 and the signal processor 106 are provided in the mobile terminal device 10. The sound generator 105 and the signal processor 106 can be provided in the headphones 20.

In the embodiments described above, an example was described in which the building 200, the rooms 201, 202, the wall 500, the door 502, etc., actually exist. When this disclosure is applied to VR (virtual reality), the building 200, the rooms 201, 202, the wall 500, the door 502, etc., can be virtual.

In the embodiments described above, the head-related transfer function is illustrated as the sound processor for changing to a second sound quality that has not been blocked. However, for example, a process for changing the volume is one example of sound processing.

The following aspects can be understood from the embodiments exemplified above.

First Aspect

A device system according to the first aspect of the present disclosure is provided with a device, a sensor, and a sound processor. The device is worn by a user. A sensor detects movement of a movable shielding object. The sound processor generates sound with a first sound quality for a state in which the shielding object blocks a virtual sound source located on the opposite side of the shielding object and emits sound from the device, and, when the sensor detects that the shielding object has moved from the position blocking the virtual sound source, the sound quality of the sound is changed from the sound quality that has been blocked by the shielding object to a second sound quality for a state in which the shielding object does not block the virtual sound source.

Second Aspect

In the device system according to the second aspect of the present disclosure, when it becomes possible for the localization position of the virtual sound source to come into direct view of the user as a result of the movement of at least one or more of the shielding object, the user, or the virtual sound source, which enables a direct view of the localization position, a sound with a third sound quality is generated instead of the sound of the second sound quality. It is thereby possible for the user to hear direct sound.

Third Aspect

The device system according to the third aspect of the present disclosure uses, as shielding objects, a wall that separates a first space in which the user is present and a second space in which the virtual sound source is localized, and a door provided on the wall. A sensor that detects the opening and closing of the door is used as the sensor. It is thereby possible to realize the sound quality for the case in which sound is heard from another room.

Fourth Aspect

A device system according to the fourth aspect of the present disclosure uses a sensor for detecting the degree of the opening/closing of the door. The sound processor generates sound with a sound quality obtained by cross-fading the first sound quality and the second sound quality, in accordance with the degree of the door's opening/closing detected by the sensor. As a result, changes in the sound quality when the door 502 is slightly opened or gradually opened can be realized.

Fifth Aspect

The device system according to the fifth aspect realizes the second sound quality by filtering using the impulse response in the second space of the virtual sound source in the position SP2 of the open door, and the head-related transfer function from the position SP2 to the user.

Sixth Aspect

A sound quality control program according to the sixth aspect causes an electronic controller of a mobile terminal device, which communicates with an acoustic device worn by a user and a sensor for detecting movement of a shielding object, to function as a sound control means for generating sound with a first sound quality for a state in which the shielding object blocks a virtual sound source localized on the opposite side of the shielding object and emitting the sound from the device, and changing the sound quality of the sound from the first sound quality to a second sound quality for a state in which the shielding object does not block the virtual sound source.

What is claimed is:

1. A sound reproduction system comprising:
an acoustic device configured to be worn by a user;
a sensor configured to detect a movement of a shielding object; and
a sound processor configured to generate sound with a first sound quality for a block state in which the shielding object blocks a virtual sound source localized on an opposite side of the shielding object and emit the sound from the acoustic device, the sound processor being further configured to change a sound quality of the sound from the first sound quality to a second sound quality for a non-block state in which the shielding object does not block the virtual sound source, in response to the sensor detecting that the shielding object moves from a position blocking the virtual sound source,
the shielding object being a wall that separates a first space in which the user is present and a second space in which the virtual sound source is localized, and a door provided on the wall,
the sensor being configured to detect an opening and closing of the door, and detect a degree of the opening and closing of the door, and
the sound processor being further configured to generate sound with a sound quality obtained by cross-fading the first sound quality and the second sound quality, in accordance with the degree of the opening and closing of the door detected by the sensor.

2. The sound reproduction system according to claim 1, wherein
when a localization position of the virtual sound source comes into direct view of the user as a result of a movement of at least one or more of the shielding object, the user, or the virtual sound source, the sound processor is further configured to generate a sound with a third sound quality for a state in which the localization position of the virtual sound source comes into the direct view, instead of the second sound quality.

3. A sound reproduction system comprising:
an acoustic device configured to be worn by a user;
a sensor configured to detect a movement of a shielding object; and
a sound processor configured to generate sound with a first sound quality for a block state in which the shielding object blocks a virtual sound source localized on an opposite side of the shielding object and emit the sound from the acoustic device, the sound processor being further configured to change a sound quality of the sound from the first sound quality to a second sound quality for a non-block state in which the shielding object does not block the virtual sound source, in response to the sensor detecting that the shielding object moves from a position blocking the virtual sound source,
the shielding object being a wall that separates a first space in which the user is present and a second space in which the virtual sound source is localized, and a door provided on the wall,
the sensor being configured to detect an opening and closing of the door, and the sound processor being further configured to generate the sound with the second sound quality that is filtered by
impulse response in the second space of the virtual sound source at a position of an open door, and
a head-related transfer function from the position of the open door to the user.

4. The sound reproduction system according to claim 3, wherein
when a localization position of the virtual sound source comes into direct view of the user as a result of a movement of at least one or more of the shielding object, the user, or the virtual sound source, the sound processor is further configured to generate a sound with a third sound quality for a state in which the localization position of the virtual sound source comes into the direct view, instead of the second sound quality.

5. A sound quality control method comprising:
generating sound with a first sound quality for a block state in which a shielding object blocks a virtual sound source localized on an opposite side of the shielding object and emitting the sound from an acoustic device, by a sound reproduction system including the acoustic device configured to be worn by a user and a sensor configured to detect a movement of the shielding object, the shielding object being a wall that separates a first space in which the user is present and a second space in which the virtual sound source is localized, and a door provided on the wall, the sensor being configured to detect an opening and closing of the door and a degree of the opening and closing of the door;
changing, by the sound reproduction system, a sound quality of the sound from the first sound quality to a second sound quality for a non-block state in which the shielding object does not block the virtual sound source, in response to the sensor detecting that the shielding object moves from a position blocking the virtual sound source; and
generating sound with a sound quality obtained by cross-fading the first sound quality and the second sound quality, in accordance with the degree of the opening and closing of the door detected by the sensor.

6. The sound quality control method according to claim 5, further comprising
generating a sound with a third sound quality for a state in which a localization position of the virtual sound source is in direct view of the user, instead of the second sound quality, when the user is in a position in which the localization position of the virtual sound source is in direct view.

7. A sound quality control method comprising:
generating sound with a first sound quality for a block state in which a shielding object blocks a virtual sound source localized on an opposite side of the shielding object and emitting the sound from an acoustic device, by a sound reproduction system including the acoustic device configured to be worn by a user and a sensor configured to detect a movement of the shielding object, the shielding object being a wall that separates a first space in which the user is present and a second space in which the virtual sound source is localized, and a door provided on the wall, the sensor being configured to detect an opening and closing of the door;
changing, by the sound reproduction system, a sound quality of the sound from the first sound quality to a second sound quality for a non-block state in which the shielding object does not block the virtual sound source, in response to the sensor detecting that the shielding object moves from a position blocking the virtual sound source; and generating the sound with the second sound quality that is filtered using impulse response in the second space of the virtual sound source at a position of an open door, and a head-related transfer function from the position of the open door to the user.

8. The sound quality control method according to claim 7, further comprising generating a sound with a third sound quality for a state in which a localization position of the virtual sound source is in direct view of the user, instead of the second sound quality, when the user is in a position in which the localization position of the virtual sound source is in direct view.

* * * * *